US008214664B2

(12) United States Patent
Lin et al.

(10) Patent No.: US 8,214,664 B2
(45) Date of Patent: Jul. 3, 2012

(54) POWER SUPPLY SYSTEM AND POWER SUPPLYING CONTROL METHOD

(75) Inventors: Chih-Wei Lin, Taipei (TW); Chih-Wan Hsu, Taipei (TW); Nung-Te Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 488 days.

(21) Appl. No.: 12/483,941

(22) Filed: Jun. 12, 2009

(65) Prior Publication Data

US 2009/0327771 A1    Dec. 31, 2009

(30) Foreign Application Priority Data

Jun. 30, 2008  (TW) ............................. 97124591 A

(51) Int. Cl.
G06F 1/26 (2006.01)
(52) U.S. Cl. .......... 713/300; 713/320; 713/323; 714/14; 714/22
(58) Field of Classification Search .................. 713/300, 713/320, 323
See application file for complete search history.

(56) References Cited

U.S. PATENT DOCUMENTS

| 5,909,583 | A  | * | 6/1999  | Hayes et al. ................... 713/300 |
| 6,018,204 | A  | * | 1/2000  | Kuruma .......................... 307/64 |
| 6,396,169 | B1 |   | 5/2002  | Voegeli et al. |
| 6,433,444 | B1 | * | 8/2002  | de Vries .......................... 307/64 |
| 6,483,756 | B2 |   | 11/2002 | Takeuchi et al. |
| 6,654,265 | B2 | * | 11/2003 | Sadler et al. ..................... 363/65 |
| 6,735,704 | B1 | * | 5/2004  | Butka et al. ................... 713/300 |
| 6,823,475 | B1 | * | 11/2004 | Harker ............................. 714/14 |
| 7,005,760 | B2 | * | 2/2006  | Eaton et al. ...................... 307/65 |

* cited by examiner

Primary Examiner — Nitin Patel
(74) Attorney, Agent, or Firm — Jianq Chyun IP Office

(57) ABSTRACT

A power supplying control method of a computer system for use with a first power supply and a second power supply both providing a first specific voltage to a motherboard, including steps of: detecting whether the first power supply and the second power supply, outputting the first specific voltage, are at a stable state; outputting the first specific voltage to a first pin when the first power supply is at the stable state; outputting the first specific voltage to the first pin when the second power supply is at the stable state; and outputting the first specific voltage to the motherboard via the first pin.

20 Claims, 5 Drawing Sheets

POWER SUPPLY SYSTEM AND POWER SUPPLYING CONTROL METHOD

CROSS-REFERENCE TO RELATED APPLICATION

This application claims the priority benefit of Taiwan application serial no. 97124591, filed on Jun. 30, 2008. The entirety of the above-mentioned patent application is hereby incorporated by reference herein and made a part of specification.

FIELD OF THE INVENTION

The present invention relates to a power supply system, and more particularly to a power supply system having two power supplies connected in parallel. The present invention also relates to a power supplying control method of a power supply system having two power supplies connected in parallel.

BACKGROUND OF THE INVENTION

The main function of a power supply arranged in a computer is firstly converting an AC power to a DC power, and then providing the DC power to a motherboard or other peripheral devices. Referring to FIG. 1, a conventional power supply system providing specific voltages to a motherboard is shown. The system comprises a power supply 80 and a motherboard 90. According to specification of the computer power supply system, the power supply 80 further comprises 24 pins, 4 pins, VGA pins, and HD pins. The 24 pins, the 4 pins, the VGA pins, and the HD pins are connected to a 24-pin plug 82, a 4-pin plug 84, a VGA plug 86, and a HD plug 88, respectively. The motherboard 90 further comprises a 24-pin jack 92, a 4-pin jack 94, a VGA jack 96, and a HD jack 98; where the 24-pin jack 92, the 4-pin jack 94, the VGA jack 96, and the HD jack 98 are corresponding to the 24-pin plug 82, the 4-pin plug 84, the VGA plug 86, and the HD plug 88, respectively. After the connected between the plugs of the power supply 80 and the corresponding jacks of the motherboard 90, the specific voltages (+3V, +5V, +5 VSB (Stand-By-Power), and +12V) can be transmitted from the power supply 80 to the motherboard 90.

However, because user may not switch off the AC power of the power supply after the shutdown of the computer, the Stand-By-Power (e.g., +5 VSB) is kept providing to the motherboard. In other words, the Stand-By-Power (e.g., +5 VSB) is always outputted from the power supply 80 to the motherboard 90 if the computer system is off but the AC power is connected to the power supply 80. After a long-term period, the circuit related to the Stand-By-Power in the power supply 80 accordingly may be easier damaged than other circuit parts in the power supply 80. Once a portion of the power supply 80 is damaged, the computer system cannot be power on successfully.

SUMMARY OF THE INVENTION

Therefore, the present invention relates to a power supply system having two power supplies connected in parallel.

The present invention provides a power supplying control method of a computer system for use with a first power supply and a second power supply both providing a first specific voltage to a motherboard, including steps of: detecting whether the first power supply and the second power supply are at a stable state; outputting the first specific voltage to a first pin when the first power supply is at the stable state; outputting the first specific voltage to the first pin when the second power supply is at the stable state; and outputting the first specific voltage to the motherboard via the first pin.

The present invention provides a power supply system adopting two power supplies connected in parallel, comprising: a first power supply comprising a first voltage-output terminal; a second power supply comprising a second voltage-output terminal; a first switch circuit comprising an input terminal connected to the first voltage-output terminal; a second switch circuit comprising an input terminal connected to the second voltage-output terminal; a first timing control circuit comprising an input terminal for receiving a first power-good signal outputted by the first power supply and an output terminal connected to an enable terminal of the first switch circuit; a second timing control circuit comprising an input terminal for receiving a second power-good signal outputted by the second power supply and an output terminal connected to an enable terminal of the second switch circuit; and, a plug comprising a first pin connected to an output terminal of the first switch circuit and an output terminal of the second switch circuit; wherein the first voltage-output terminal and the second voltage-output terminal are capable of outputting a first specific voltage.

The present invention provides a computer comprising a power supply system adopting two power supplies connected in parallel, comprising: a first power supply comprising a first voltage-output terminal; a second power supply comprising a second voltage-output terminal, wherein the first voltage-output terminal and the second voltage-output terminal are capable of outputting a first specific voltage; a first switch circuit comprising an input terminal connected to the first voltage-output terminal; a second switch circuit comprising an input terminal connected to the second voltage-output terminal; a third switch circuit comprising an input terminal for receiving a first power-good signal outputted by the first power supply; a fourth switch circuit comprising an input terminal for receiving a second power-good signal outputted by the second power supply; a first timing control circuit comprising an input terminal for receiving the first power-good signal and an output terminal connected to an enable terminal of the first switch circuit; a second timing control circuit comprising an input terminal for receiving the second power-good signal and an output terminal connected to an enable terminal of the second switch circuit; a plug comprising a first pin connected to an output terminal of the first switch circuit and an output terminal of the second switch circuit; a logic gate comprises a first input terminal connected to an output terminal of the third switch circuit, a second input terminal connected to an output terminal of the fourth switch circuit, and an output terminal connected to a second pin of the plug for outputting a third power good signal; and, a motherboard comprising a jack connected to the plug, wherein the first specific voltage is inputted to the motherboard via the first pin of the plug and the third power-good signal is inputted to the motherboard via the second pin of the plug.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
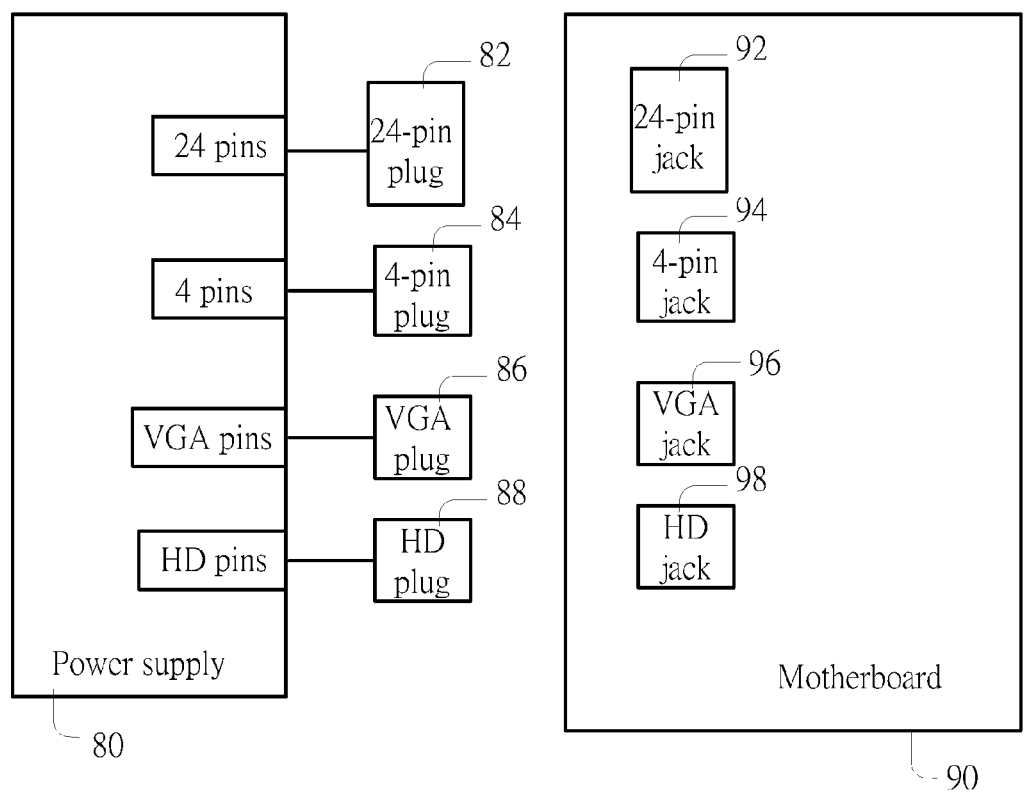
FIG. 1 schematically illustrating a conventional power supply system.
Figure 2:
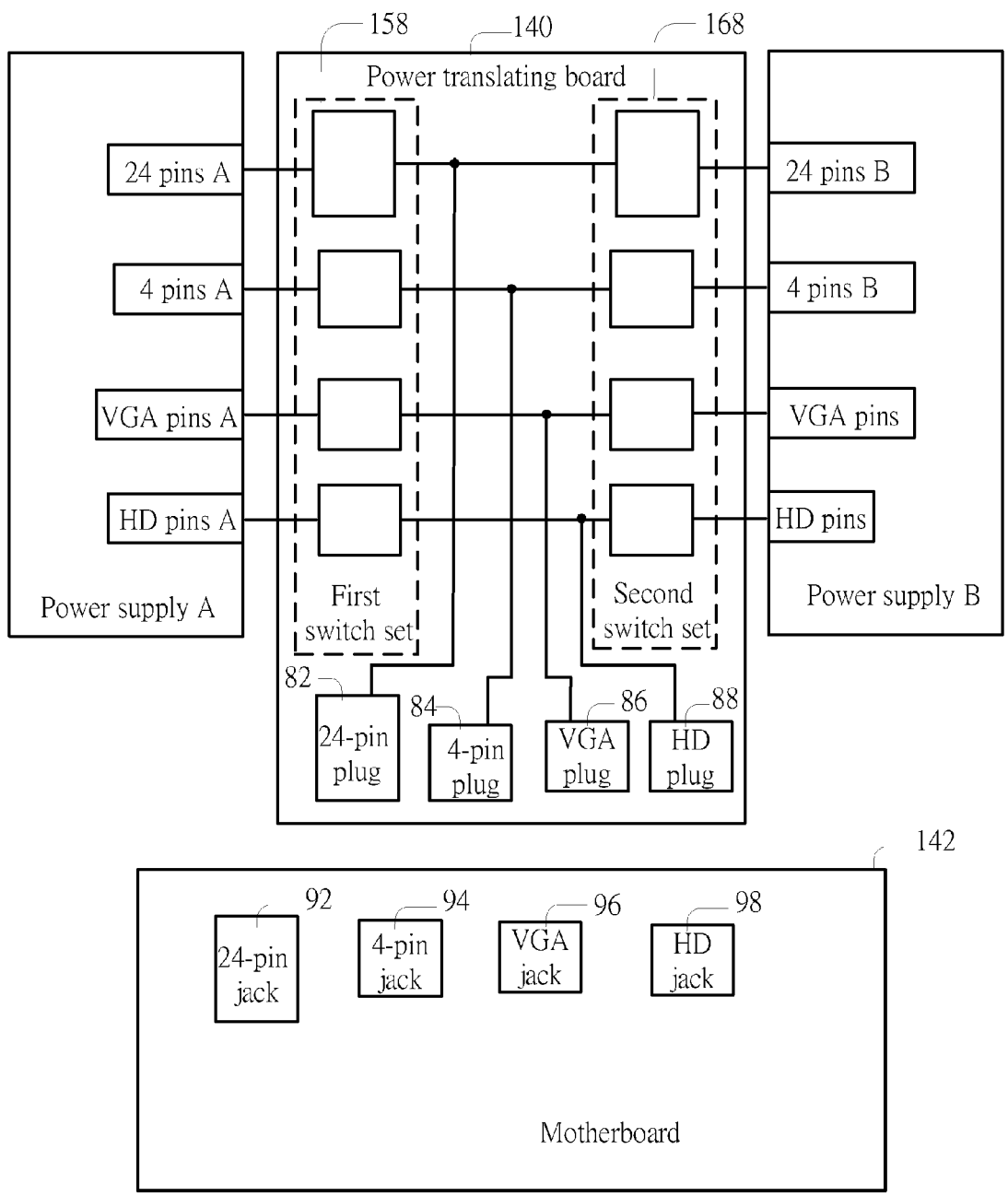
FIG. 2 is a functional block diagram illustrating a power supply system adopting two power supplies connected in parallel of the present invention.

Referring to FIG. 2, a power supply system adopting two power supplies connected in parallel of the present invention providing specific voltages to a motherboard is shown. The power supply system of the present invention, connected to a motherboard 142, comprises a power supply A, a power supply B, and a power translating board 140, where the power supply A comprises a pin set (24 pins A, 4 pins A, VGA pins A, HD pins A) for outputting specific voltages (+3V, +5V, +5 VSB, +12V), the power supply B also comprises a pin set (24 pins B, 4 pins B, VGA pins B, HD pins B) for outputting specific voltages (+3V, +5V, +5 VSB, +12V).

Moreover, the pin set of the power supply A (24 pins A, 4 pins A, VGA pins A, HD pins A) are connected to a first switch set 158 arranged on the power translating board 140. The pin set of the power supply B (24 pins B, 4 pins B, VGA pins B, HD pins B) are connected to a second switch set 168 on the power translating board 140. Moreover, the parallel structure of the power supply A and the power supply B is achieved via connecting the switches in the first switch set 158 and the corresponding switches in the second switch set 168. Moreover, because the parallel connection of the power supply A and the power supply B, the 24 pins A and the 24 pins B are together connected to the 24-pin plug 82; the 4 pins A and the 4 pins B are together connected to the 4-pin plug 84; the VGA pins A and the VGA pins B are together connected to the VGA plug 86; and the HD pins A and the HD pins B are together connected to the HD plug 88. As mentioned above, the jack set of the motherboard 142 (24-pin jack 92, 4-pin jack 94, VGA jack 96, HD jack 98) are respectively connected to the plug set of the power translating board 140 (24-pin plug 82, 4-pin plug 84, VGA plug 86, HD plug 88).

Before the motherboard 142 is active, only the Stand-By-Power (e.g., +5 VSB) is provided from the power supplies A and B to the motherboard 142. After the motherboard 142 is active resulted from the power button of the computer is pressed, the power supplies A and B are activated by the motherboard 142, and the specific voltages (+3V, +5V, and +12V), demanded of the motherboard 142, are started to be built by the power supplies A and B and then outputted to the motherboard 142 via a plurality of voltage-output terminal in the pin set of the power supplies A and B. That is, the specific voltages (+3V, +5V, and +12V) built by the power supply A, are firstly outputted from the pin set of the power supply A (24 pins A, 4 pins A, VGA pins A, HD pins A), and then transmitted to the motherboard 142 via the power translating board 140. Similarly, the specific voltages (+3V, +5V, and +12V) built from the power supply B, are firstly outputted from the pin set of the power supply B (24 pins B, 4 pins B, VGA pins B, HD pins B), and then transmitted to the motherboard 142 via the power translating board 140. Because the power supplies A and B are connected in parallel, the motherboard 142 can get the specific voltages (+3V, +5V, and +12V) via the power translating board 140 if either one of the power supplies A and B is successfully active and starts to build the specific voltages (+3V, +5V, and +12V).

Figure 3:
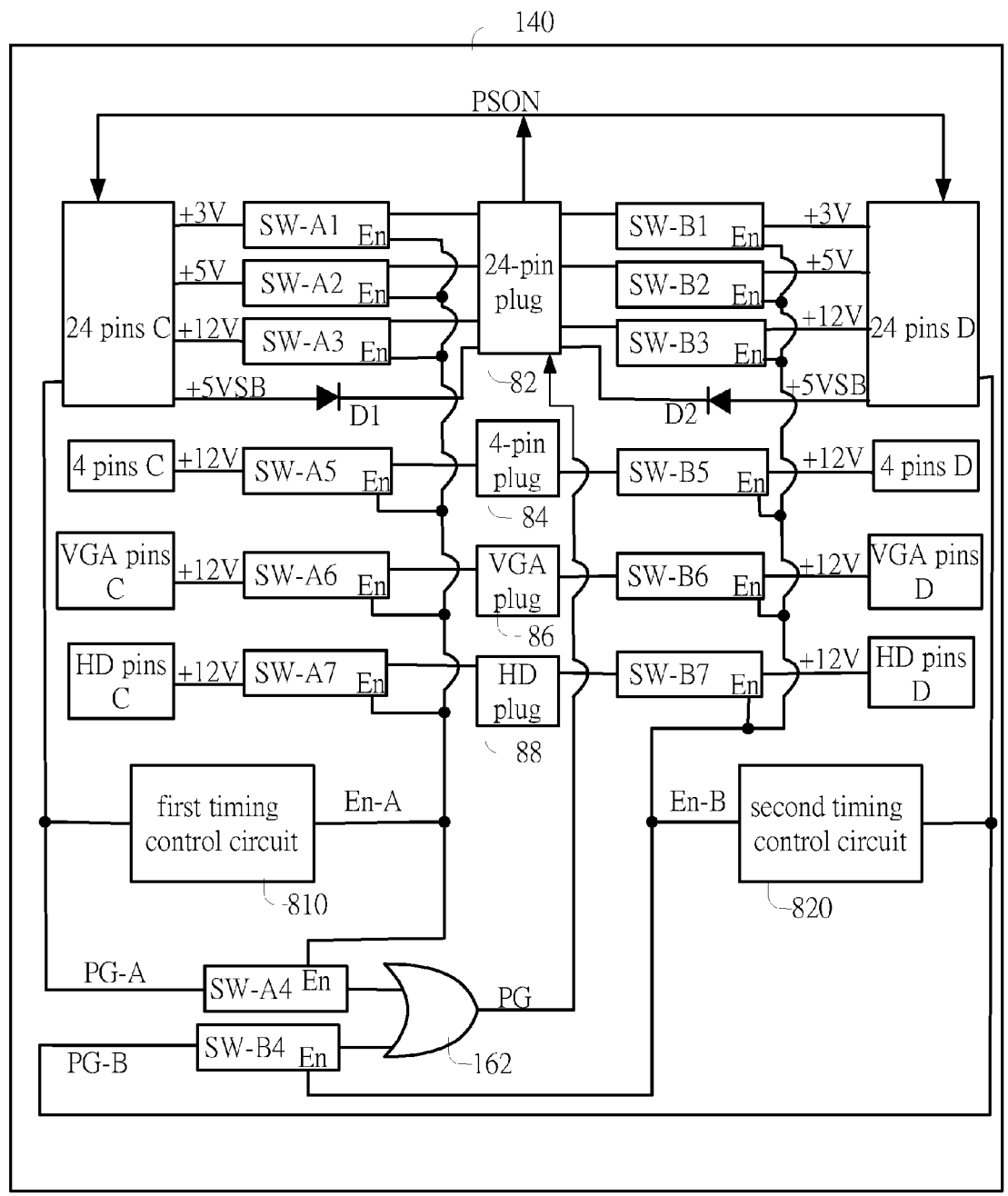
FIG. 3 is a functional block diagram illustrating the power translating board adopted in the present invention.

Referring to FIG. 3, a block diagram of the power translating board adopted in the power supply system of the present invention is shown. The power translating board 140 further comprises two pin sets, where the pin set arranged near the power supply A side (24 pins C, 4 pins C, VGA pins C, HD pins C) are connected to the pin set of the power supply A (24 pins A, 4 pins A, VGA pins A, HD pins A), respectively; the pin set arranged near the power supply B side (24 pins D, 4 pins D, VGA pins D, HD pins D) are connected to the pin set of the power supply B (24 pins B, 4 pins B, VGA pins B, HD pins B), respectively.

Moreover, the power translating board 140 further comprises two switch sets, where the first switch set comprises 7 switch circuits (SW-A1, SW-A2, SW-A3, SW-A4, SW-A5, SW-A6, SW-A7) and the second switch set comprises 7 switch circuits (SW-B1, SW-B2, SW-B3, SW-B4, SW-B5, SW-B6, SW-B7). Moreover, a +3V-output terminal (for outputting +3V) in the 24 pins C is connected to the 24-pin plug 82 via the switch circuit SW-A1; a +5V-output terminal (for outputting +5V) in the 24 pins C is connected to the 24-pin plug 82 via the switch circuit SW-A2; a +12V-output terminal (for outputting +12V) in the 24 pins C is connected to the 24-pin plug 82 via the switch circuit SW-A3; the +12V-output terminal in the 4 pins C is connected to the 4-pin plug 84 via the switch circuit SW-A5; the +12V-output terminal in the VGA pins C is connected to the VGA plug 86 via the switch circuit SW-A6; and the +12V-output terminal in the HD pins C is connected to the HD plug 88 via the switch circuit SW-A7.

Similarly, the +3V-output terminal in the 24 pins D is connected to the 24-pin plug 82 via the switch circuit SW-B1; the +5V-output terminal in the 24 pins D is connected to the 24-pin plug 82 via the switch circuit SW-B2; the +12V-output terminal in the 24 pins D is connected to the 24-pin plug 82 via the switch circuit SW-B3; the +12V-output terminal in the 4 pins D is connected to the 4-pin plug 84 via the switch circuit SW-B5; the +12V-output terminal in the VGA pins D is connected to the VGA plug 86 via the switch circuit SW-B6; and the +12V-output terminal in the HD pins D is connected to the HD plug 88 via the switch circuit SW-B7.

Moreover, for providing the Stand-By-Power to the motherboard before the motherboard is active, a +5 VSB-output terminal (for outputting a Stand-By-Power of +5 VSB) in the 24 pins C is connected to the 24-pin plug 82 via a first diode (D1); a +5 VSB-output terminal in the 24 pins D is connected to the 24-pin plug 82 via a second diode (D2).

When the motherboard 142 (FIG. 2) is active resulted from the power button of the computer is pressed, a PSON signal (Power Switch On) is outputted from the 24-pin jack 92 of the motherboard 142. The PSON signal is then transmitted to the power supply A sequentially via the 24-pin plug 82 and one of the 24 pins C (FIG. 3). Similarly, the PSON signal is also transmitted to the power supply B sequentially via the 24-pin plug 82 and one of the 24 pins D. After the PSON signal is transmitted to the power supply A or B, the power supply A or B is accordingly activated by the motherboard 142 and starts to build the specific voltages (+3V, +5V, and +12V). After all the specific voltages (+3V, +5V, and +12V) are built by power supply A, the power supply A is at a stable state and a Power Good Signal (PG-A) is then outputted from the power supply A to one of the 24 pins C. Similarly, after all the specific voltages (+3V, +5V, and +12V) are built by power supply B, the power supply B is at a stable state and a Power Good Signal (PG-B) is then outputted from the power supply B to one of the 24 pin D. In other words, the Power Good Signal of the power supply A (PG-A) is outputted from the power supply A when the power supply A is at the stable state and the Power Good Signal of the power supply B (PG-B) is outputted from the power supply B when the power supply B is at the stable state.

In the embodiment of the present invention, an OR gate 162 is arranged on the power translating board 140. The Power Good Signal (PG-A) and the Power Good Signal (PG-B) are respectively transmitted to two input terminals of the switch circuit SW-A4 and the switch circuit SW-B4. Two output terminals of the switch circuit SW-A4 and the switch circuit SW-B4 are connected to the OR gate 162 and an output terminal of the OR gate 162 is connected to the 24-pin plug 82.

Because the function of the OR gate 162, the Power Good Signal (PG) will be outputted from the output terminal of the OR gate 162 and then further transmitted to the motherboard 142 sequentially via the 24-pin plug 82 and the 24-pin jack 92 if only either one of the power supplies A and B is at the stable state. In other words, the power supply system of the present invention is at a stable state if one of the two power supplies A and B is at the stable state, and the motherboard 142 can be aware of whether the power supply system (constructed by the power supplies A and B) is at stable state based on the Power Good Signal (PG). Moreover, it is understood the OR gate 162 can be replaced by an AND gate, and accordingly the Power Good Signal (PG) is outputted from the output terminal of the AND gate and then further transmitted to the motherboard 142 if both the power supplies A and B are at the stable state.

In the embodiment of the present invention, two timing control circuits 810 and 820, for controlling the switch circuits according to the Power Good Signal (PG), are arranged on the power translating board 140. A first enable signal (En-A), for activating the switch circuits (SW-A1, SW-A2, SW-A3, SW-A5, SW-A6, SW-A7), is outputted from the first timing control circuit 810 after the Power Good Signal (PG-A) is inputted to the first timing control circuit 810. Similarly, a second enable signal (En-B), for activating the switch circuits (SW-B1, SW-B2, SW-B3, SW-B4, SW-B5, SW-B6, SW-B7), is outputted from the second timing control circuit 820 after the Power Good Signal (PG-B) is inputted to the second timing control circuit 820.

When the power supplies A and B start to build the power voltages (+3V, +5V, and +12V) after receiving the PSON signal derived from the motherboard, at the meanwhile all the switch circuits on the power translating board 140 (SW-A1, SW-A2, SW-A3, SW-A4, SW-A5, SW-A6, SW-A7, SW-B1, SW-B2, SW-B3, SW-B4, SW-B5, SW-B6, SW-B7) are still disable due to the power voltages (+3V, +5V, and +12V) are not completely built and the first enable signal (En-A) and the second enable signal (En-B) are not outputted from the power supplies A and B yet.

After the power voltages (+3V, +5V, and +12V) outputted from the power supply A are built completely and the power good signal (PG-A) is outputted from the power supply A, the first enable signal (En-A) is then outputted from the first timing control circuit 810, accordingly the switch circuits (SW-A1, SW-A2, SW-A3, SW-A4, SW-A5, SW-A6, SW-A7) are enable. Similarly, after the power voltages (+3V, +5V, and +12V) outputted from the power supply B are built completely and the power good signal (PG-B) is outputted from the power supply B, the first enable signal (En-B) is then outputted from the second timing control circuit 820, accordingly the switch circuits (SW-B1, SW-B2, SW-B3, SW-B4, SW-B5, SW-B6, SW-B7) are enable.

After the switch circuit is enable, a detect circuit implemented in the switch circuit starts to detect the amplitude of the voltage at the input and output terminals of the switch circuit, and then controls the switch circuit to connection or disconnection according to the detected result. Once the voltage at the input terminal is greater than the voltage at the output terminal, the switch circuit is controlled to connected, so as the power voltages (+3V, +5V, and +12V) can be transmitted to the motherboard 142 from the power supply via the connected switch circuit.

Figure 4:
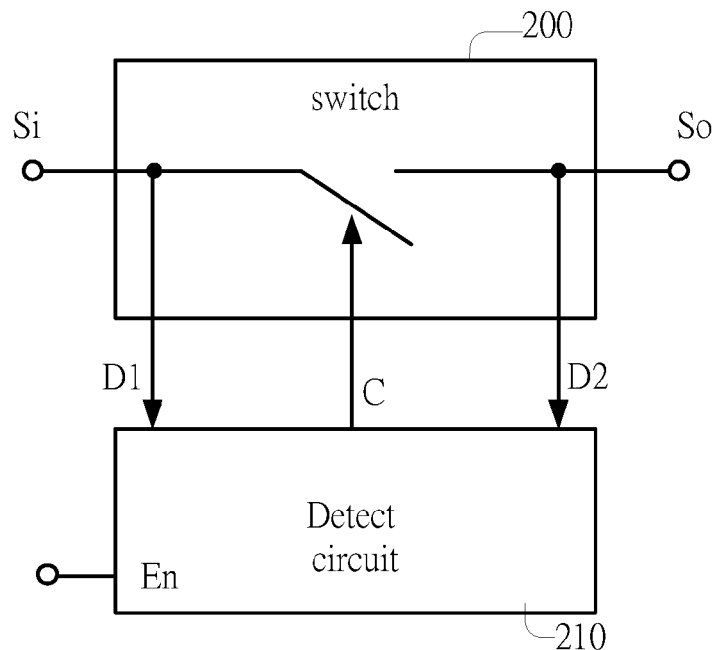
FIG. 4 schematically illustrating the switch circuit adopted in the present invention.

Referring to FIG. 4, a scheme of the switch circuit adopted in the present invention is shown, where all the switch circuits (SW-A1, SW-A2, SW-A3, SW-A4, SW-A5, SW-A6, SW-A7, SW-B1, SW-B2, SW-B3, SW-B4, SW-B5, SW-B6, SW-B7) in the embodiment of the present invention have a same circuit design. The switch circuit comprises a switch 200 and a detect circuit 210. The connection or disconnection between an input terminal (Si) and an output terminal (So) of the switch 200 is controlled by a control signal (C) which is outputted from the detect circuit 210. The detect circuit 210 further comprises two detect terminals (D1, D2) which are connected to the input terminal (Si) and the output terminal (So) of the switch 200, respectively. The control signal (C) with a first level, for the connection of the switch 200, is outputted from the detect circuit 210 if the voltage at the detect terminal (D1) is greater than the voltage at the detect terminal (D2). On the other hand, the control signal (C) with a second level, for the disconnection of the switch 200, is outputted from the detect circuit 210 if the voltage at the detect terminal (D1) is not greater than the voltage at the detect terminal (D2). Moreover, the input terminal (Si) of the switch 200 is connected to the corresponding pins at the power supply side (power supplies A or B); and the output terminal (So) of the switch 200 is connected to the corresponding pins at the plug side.

Figure 5:
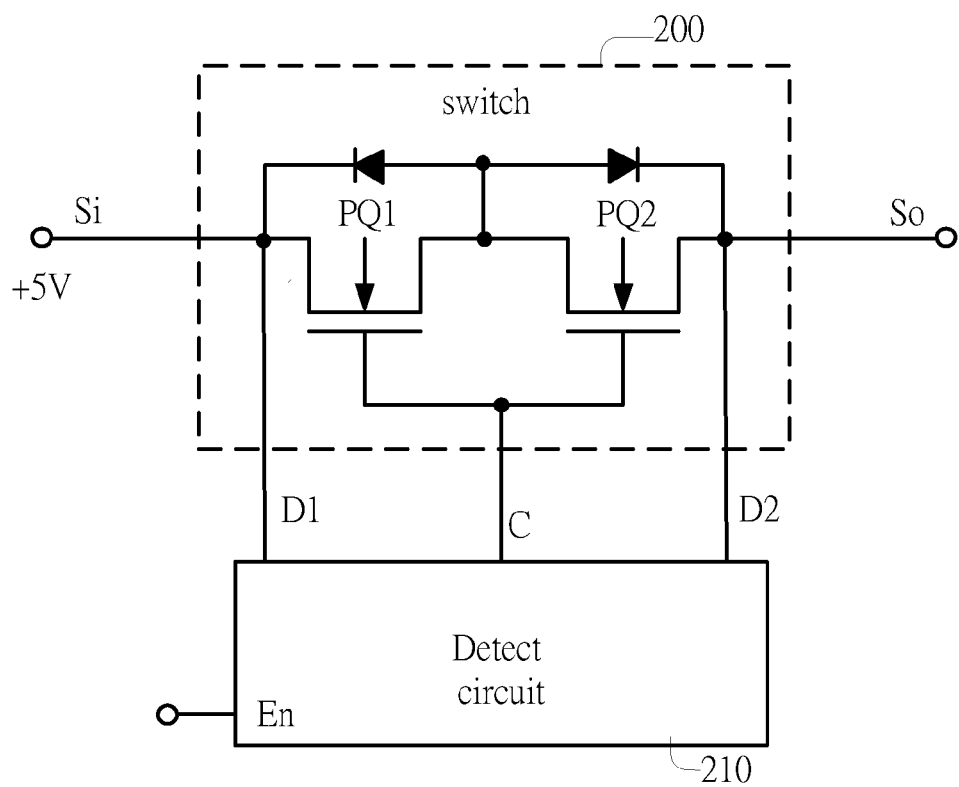
FIG. 5 is a circuit diagram of the switch circuit adopted in the present invention.

Referring to FIG. 5, a circuit diagram of the switch circuit adopted in the present invention is shown. The switch 200 is constructed by two MOSFETs (PQ1, PQ2), where the two MOSFETs (PQ1, PQ2) have a back-to-back structure which means both the Bodies of the two MOSFETs (PQ1, PQ2) are attached together. Because the back-to-back structure, a Body Diode is formed in the internal of the two MOSFETs (PQ1, PQ2) and the Body Diode can prevent the leakage current flowing between the motherboard and the power supplies A or B. Moreover, because the Body Diode, the current is restricted to flow from the power supplies A or B to the motherboard. That is, no current can flow to the power supply A if power supply A is off but power supply B is on, or no current can flow to the power supply B if power supply A is on but power supply B is off. Moreover, to guarantee both the MOSFETs (PQ1, PQ2) can be connected by the control signal (C) no matter the input terminal (Si) is inputted by any specific voltages (+3V, +5V, and +12V), a voltage booster, for boosting the Stand-By-Power of +5 VSB to a Stand-By-Power of +24 VSB, is introduced in the detect circuit 210. That is, the control signal (C) is boosted to a Stand-By-Power of +24 VSB that is relative high than any other specific voltages (+3V, +5V, and +12V). The voltage booster will not be discussed in detail due to the voltage booster is a well-known circuit applied widely in lots of control circuits. Moreover, the detect circuit (or the voltage booster) can be enabled by the related enable signal (En-A or En-B).

For more understanding the function of the switch circuit adopted in the present invention, a transmitting process of a specific voltages of +5V outputted from a power supply to the motherboard via the switch circuit is took as an example. Please refer to FIG. 5 again. The input terminal (Si) of the switch 200 is inputted by +5V that is outputted from the power supply side and the output terminal (So) of the switch 200 is connected to the 24-pin plug 82 (FIG. 3).

As described above, the two detect terminals (D1, D2) are connected to the input terminal (Si) and the output terminal (So) of the switch 200, respectively. When the voltage at the detect terminal (D1) is greater than the voltage at the detect terminal (D2), the control signal at a high level (+24 VSB) for the connected of the switch 200 is outputted from the detect circuit 210. Accordingly, +5V originally outputted from the power supply side can be transmitted to the 24-pin jack 82 (FIG. 3). On the other hand, if the voltage at the detect terminal (D1) is not greater than the voltage at the detect terminal (D2), the control signal at a low level (less than +24 VSB) for the disconnection of the switch 200 is outputted from the detect circuit 210. Accordingly, +5V cannot be transmitted to the 24-pin jack 82 (FIG. 3).

Figure 6:
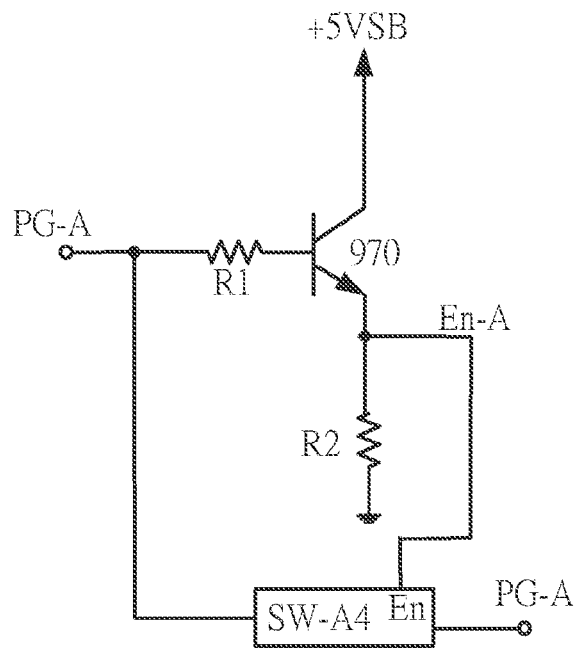
FIG. 6 is a circuit diagram of the first timing control circuit connected to the switch circuit (SW-A4)

Referring to FIG. 6, a circuit diagram of the first timing control circuit connected to the switch circuit (SW-A4) is shown. The first timing control circuit mainly comprises a BJT 970, a first resistor R1, and a second resistor R2. An input terminal of the first timing control circuit is connected to a first terminal of the first resistor, a second terminal of the first resistor R2 is connected to the base of the BJT 970; the collector of the BJT 970 is connected to +5 VSB; the second resistor is connected between the ground and the emitter of the BJT 970; and an output terminal of the first timing control circuit is connected to the emitter of the BJT 970. Furthermore, the power good signal (PG-A) is inputted to the input terminals of the first timing control circuit and the switch circuit (SW-A4); and the output terminal of the first timing control circuit is connected to the enable terminal of the switch circuit (SW-A4).

As depicted in FIG. 6, the BJT 970 is activated when a high level of the power good signal (PG-A) is inputted to the base of the BJT 970, so as the first enable signal (En-A) is pulled up to a high level. Afterwards, the switch circuit (SW-A4) is enable by the first enable signal (En-A) with a high level, so as the power good signal (PG-A) can be further transmitted to the output terminal of the switch circuit (SW-A4) via the enable switch circuit (SW-A4). Similarly, all the specific voltages (+3V, +5V, and +12V) can be transmitted to the output terminals of related switch circuits according to the same manner. It is to be understood that the switch circuit needs not be limited to be implemented by the above-described circuit. The timing control circuit depicted in FIG. 6 also can be implemented by a buffer circuit.

To sum up, the Power-Switch-On Signal (PSON), for activating the power supplies A and B, is firstly outputted from the motherboard after user pushing the power button of the computer. Then, all the specific voltages (+3V, +5V, and +12V) are started to build by the power supply A and B. Before the specific voltages (+3V, +5V, and +12V) are completely built, all the switch circuits are disable due to the enable signals (En-A, En-B) are still pulled down to a low level by the timing control circuit. After all the specific voltages (+3V, +5V, and +12V) outputted from the power supply A are completely built and accordingly the Power Good Signal (PG-A) is transmitted to the first timing control circuit 810, and then the first timing control circuit 810 is activated. Then, the enable signals (En-A) is pulled up to a high level and all the connected switch circuits (SW-A1, SW-A2, SW-A3, SW-A4, SW-A5, SW-A6, SW-A7) are accordingly enabled. Similarly, after all the specific voltages (+3V, +5V, and +12V) outputted from the power supply B are completely built and accordingly the Power Good Signal (PG-B) is transmitted to the second timing control circuit 820, and then the second timing control circuit 820 is activated. Then, the enable signals (En-B) is pulled up to a high level and all the connected switch circuits (SW-B1, SW-B2, SW-B3, SW-B4, SW-B5, SW-B6, SW-B7) are accordingly enabled.

Moreover, if one of the power supply (e.g., power supply A) in the power supply system of the present invention is damaged and cannot normally output the specific voltages of +5V (such as +1.5V), the switch circuit SW-A1 accordingly is disconnected due to the voltage at the power supply A side (+1.5V) is less than the voltage (+5V) at the 24-pin plug 82 side (FIG. 3), where the source of the voltage at the 24-pin plug 82 side is from the power supply B. It follows the specific voltages outputted from the power supply A (+1.5V) cannot flow to the motherboard via the disconnected switch circuit SW-A1, and accordingly all the specific voltages of +5V inputted to the motherboard is from the power supply B. In other words, the motherboard still can get +5V from the power supply B even the power supply A is damaged. Similarly, the motherboard still can get all other specific voltages (+3V and +12V) if either power supplies A or B is damaged.

Figure 7:
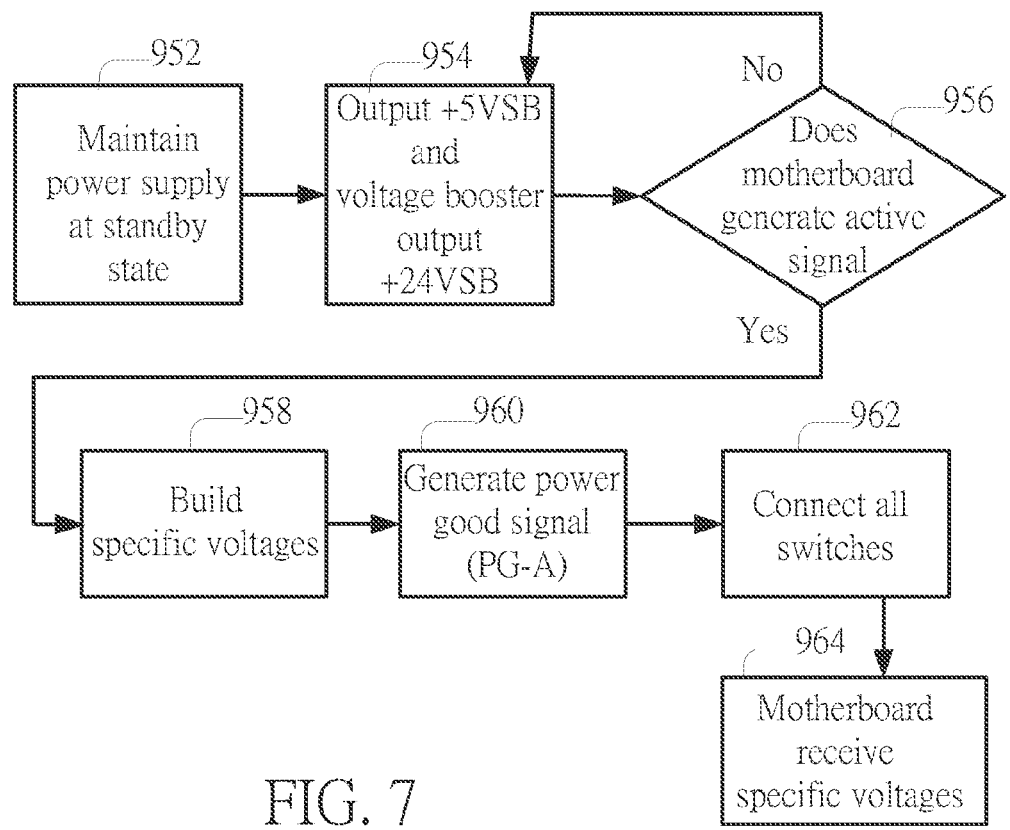
FIG. 7 is a flowchart illustrating the operating steps of the present invention.

Referring to FIG. 7, a flowchart of a control method use with the present invention is shown (only power supply A is introduced in the flowchart). Before the power button of the computer is pressed, the power supply is maintained at the stand-by state initially (step 952). When the power supply is at the stand-by state, only the +5 VSB is outputted to the motherboard; moreover, the +5 VSB is also boosted to the +24 VSB by the voltage booster in the detect circuit (step 954). In step 956, the flowchart will move back to step 954 if the Power-Switch-On Signal (PSON) is not outputted from the motherboard (or the power button of the computer is not pressed). Alternatively, the flowchart moves to step 958 if the Power-Switch-On Signal (PSON) is outputted from the motherboard (or the power button of the computer is pressed).

After the specific voltages (+3V, +5V, +12V) are built completely (step 958), the Power Good Signal (PG-A) is outputted from the power supply A (step 960). Afterward, the first timing control circuit 810 is activated by the Power Good Signal (PG-A), so as the first enable signal (En-A) is pulled up to a high level, and accordingly all the related switch circuits are connected (step 962). Afterward, the specific voltages (+3V, +5V, +12V) built by the Power Good Signal (PG-A) can be further transmitted to the motherboard via the connected switch circuits (step 964).

To sum up, via the power translating board in the power supply system of the present invention, the motherboard always can get all the necessary specific voltages even one of the two power supplies is damaged. Moreover, based on the two MOSFETs (PQ1, PQ2) structured in back-to-back, all the currents are guaranteed to flow from the power supplies to the motherboard and no leakage currents can flow between the power supply and the motherboard.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supplying control method of a computer system having a first power supply and a second power supply both providing a first specific voltage to a motherboard, comprising steps of:
   detecting whether the first power supply and the second power supply are at a stable state by a power translating board, whereien the power translating board has a first timing control circuit conneced to a first switch circuit and a second timing control circuit connected to a second switch circuit;
   outputting a first enable signal to the first switch circuit by the first timing control circuit and outputting the first specific voltage to a first pin by the first switch circuit when the first power supply is at the stable state;
   outputting a second enable signal to the second switch circuit by the second timing control circuit and outputting the first specific voltage to the first pin by the second switch circuit when the second power supply is at the stable state; and
   outputting the first specific voltage to the motherboard via the first pin.

2. The method according to claim 1 wherein the first power supply is determined at the stable state when the first power supply generates a first power-good signal; and the second power supply is determined at the stable state when the second power supply generates a second power-good signal.

3. The method according to claim 1 further comprising steps of:
   controlling the first switch circuit for outputting the first specific voltage to the first pin when the first power supply is at the stable state; and
   controlling the second switch circuit for outputting the first specific voltage to the first pin when the second power supply is at the stable state.

4. The method according to claim 1 wherein the first power supply and the second power supply start to build the first specific voltage after receiving a power on signal.

5. The method according to claim 1 wherein the first specific voltage is +3V, +5V, or +12V.

6. A power supply system adopting two power supplies connected in parallel, comprising:
   a first power supply comprising a first voltage-output terminal;
   a second power supply comprising a second voltage-output terminal;
   a first switch circuit comprising an input terminal connected to the first voltage-output terminal;
   a second switch circuit comprising an input terminal connected to the second voltage-output terminal;
   a first timing control circuit comprising an input terminal for receiving a first power-good signal outputted by the first power supply and an output terminal connected to an enable terminal of the first switch circuit;
   a second timing control circuit comprising an input terminal for receiving a second power-good signal outputted by the second power supply and an output terminal connected to an enable terminal of the second switch circuit; and
   a plug comprising a first pin connected to an output terminal of the first switch circuit and an output terminal of the second switch circuit;
   wherein the first voltage-output terminal and the second voltage-output terminal both are capable of outputting a first specific voltage.

7. The power supply system adopting two power supplies connected in parallel according to claim 6 wherein the plug further comprises a second pin, and a power on signal outputted from a motherboard is transmitted to the first power supply and the second power supply via the second pin.

8. The power supply system adopting two power supplies connected in parallel according to claim 6 further comprising a third switch circuit, a fourth switch circuit, and a logic gate, wherein the logic gate comprises a first input terminal connected to an output terminal of the third switch circuit, a second input terminal connected to an output terminal of the fourth switch circuit, and an output terminal connected to a third pin of the plug; the third switch circuit comprises an input terminal connected to the first power supply for receiving the first power-good signal; and the fourth switch circuit comprises an input terminal connected to the second power supply for receiving the second power-good signal.

9. The power supply system adopting two power supplies connected in parallel according to claim 8 wherein the first switch circuit, the second switch circuit, the first timing control circuit, the second timing control circuit, the third switch circuit, the fourth switch circuit, and the logic gate are designed on a power translating board.

10. The power supply system adopting two power supplies connected in parallel according to claim 8 wherein the third switch circuit comprises an enable terminal connected to the first timing control circuit, and the third switch circuit can be activated by the first timing control circuit according to the power-good signal outputted from the first power supply; the fourth switch circuit comprises an enable terminal connected to the second timing control circuit, and the fourth switch circuit can be activated by the second timing control circuit according to the power-good signal outputted from the second power supply.

11. The power supply system adopting two power supplies connected in parallel according to claim 6 wherein the specific voltage outputted from the first voltage-output terminal is +3V, +5V, or +12V.

12. The power supply system adopting two power supplies connected in parallel according to claim 6 wherein the plug is a 24-pin plug, a 4-pin plug, a VGA plug, or a HD plug.

13. The power supply system adopting two power supplies connected in parallel according to claim 6 wherein the first switch circuit further comprises: a switch comprising an input terminal being the input terminal of the first switch circuit, an output terminal being the output terminal of the first switch circuit, and a control terminal; and a detect circuit comprising a first detect terminal connected to the input terminal of the first switch circuit and a second detect terminal connected to the output terminal of the first switch circuit, wherein a control signal is outputted from the detect circuit to the control terminal; wherein the switch is connected if the voltage at the first detect terminal is greater than the voltage at the second detect terminal; or the switch is disconnected if the voltage at the first detect terminal is not greater than the voltage at the second detect terminal.

14. The power supply system adopting two power supplies connected in parallel according to claim 13 wherein the voltage of the control signal is greater than the first specific voltage.

15. A computer comprising a power supply system adopting two power supplies connected in parallel, comprising:
   a first power supply comprising a first voltage-output terminal;
   a second power supply comprising a second voltage-output terminal, wherein the first voltage-output terminal and the second voltage-output terminal are capable of outputting a first specific voltage;

a first switch circuit comprising an input terminal connected to the first voltage-output terminal;

a second switch circuit comprising an input terminal connected to the second voltage-output terminal;

a third switch circuit comprising an input terminal for receiving a first power-good signal outputted by the first power supply;

a fourth switch circuit comprising an input terminal for receiving a second power-good signal outputted by the second power supply;

a first timing control circuit comprising an input terminal for receiving the first power-good signal and an output terminal connected to an enable terminal of the first switch circuit;

a second timing control circuit comprising an input terminal for receiving the second power-good signal and an output terminal connected to an enable terminal of the second switch circuit;

a plug comprising a first pin connected to an output terminal of the first switch circuit and an output terminal of the second switch circuit;

a logic gate comprises a first input terminal connected to an output terminal of the third switch circuit, a second input terminal connected to an output terminal of the fourth switch circuit, and an output terminal connected to a second pin of the plug for outputting a third power good signal; and a motherboard comprising a jack connected to the plug, wherein the first specific voltage is inputted to the motherboard via the first pin of the plug and the third power-good signal is inputted to the motherboard via the second pin of the plug.

16. The computer comprising a power supply system adopting two power supplies connected in parallel according to claim 15 wherein the plug further comprises a third pin, wherein a power on signal is transmitted from the motherboard to the first power supply and the second power supply via the third pin.

17. The computer comprising a power supply system adopting two power supplies connected in parallel according to claim 15 wherein the first switch circuit, the second switch circuit, the first timing control circuit, the second timing control circuit, the third switch circuit, the fourth switch circuit, and the logic gate are designed on a power translating board.

18. The computer comprising a power supply system adopting two power supplies connected in parallel according to claim 15 wherein the first voltage is +3V, +5V, or +12V.

19. The computer comprising a power supply system adopting two power supplies connected in parallel according to claim 15 wherein the first switch circuit further comprises: a switch comprising an input terminal being the input terminal of the first switch circuit, an output terminal being the output terminal of the first switch circuit, and a control terminal; and a detect circuit comprising a first detect terminal connected to the input terminal of the first switch circuit and a second detect terminal connected to the output terminal of the first switch circuit, wherein a control signal is outputted from the detect circuit to the control terminal; wherein the switch is connected if the voltage at the first detect terminal is greater than the voltage at the second detect terminal; or the switch is disconnected if the voltage at the first detect terminal is not greater than the voltage at the second detect terminal.

20. The computer comprising a power supply system adopting two power supplies connected in parallel according to claim 19 wherein the voltage of the control signal is greater than the first specific voltage.

\* \* \* \* \*